US011402017B1

(12) United States Patent
Hathaway et al.

(10) Patent No.: US 11,402,017 B1
(45) Date of Patent: Aug. 2, 2022

(54) SYSTEMS AND METHODS FOR OPERATING TRANSMISSION WITH AUXILIARY PUMP IN POWER-LIMITING MODE

(71) Applicant: FORD GLOBAL TECHNOLOGIES, LLC, Dearborn, MI (US)

(72) Inventors: Richard Reynolds Hathaway, Livonia, MI (US); Edward Katynski, Northville, MI (US); Jerry Lee Aeschliman, Jr., Westland, MI (US); David Gilewski, Commerce Township, MI (US); Stephen John Bettley, Milford, MI (US); Kurt Howard Nickerson, Shelby Township, MI (US); Robert E. Meyer, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/232,709

(22) Filed: Apr. 16, 2021

(51) Int. Cl.
*F16H 61/12* (2010.01)
*F16H 59/44* (2006.01)
*F16H 59/68* (2006.01)
*F16H 59/40* (2006.01)
*F16H 57/04* (2010.01)
*F16H 61/16* (2006.01)
*F16H 61/00* (2006.01)

(52) U.S. Cl.
CPC ......... *F16H 61/12* (2013.01); *F16H 57/0439* (2013.01); *F16H 59/40* (2013.01); *F16H 59/44* (2013.01); *F16H 59/68* (2013.01); *F16H 61/0031* (2013.01); *F16H 61/16* (2013.01); *F16H 2059/683* (2013.01); *F16H 2061/124* (2013.01); *F16H 2061/1216* (2013.01); *F16H 2061/1224* (2013.01); *F16H 2061/168* (2013.01)

(58) Field of Classification Search
CPC ...... F16H 57/0439; F16H 59/40; F16H 59/44; F16H 59/68; F16H 2059/683; F16H 61/12; F16H 61/0031; F16H 61/16; F16H 2016/1216; F16H 2061/1224; F16H 2016/124; F16H 2016/168
See application file for complete search history.

(56) References Cited

U.S. PATENT DOCUMENTS

| 8,116,932 B2 | 2/2012 | Aldrich, III et al. |
| 8,219,291 B2 | 7/2012 | Yabes et al. |
| 9,821,799 B2 | 11/2017 | Khafagy et al. |

(Continued)

FOREIGN PATENT DOCUMENTS

CN 108799085 A 11/2018

*Primary Examiner* — Edwin A Young
(74) *Attorney, Agent, or Firm* — Vincent Mastrogiacomo; Brooks Kushman P.C.

(57) ABSTRACT

A vehicle includes an engine and a transmission having an input shaft operably coupled to the engine, an output shaft operably coupled to wheels of the vehicle, a primary pump, and a secondary pump. The primary and secondary pumps are each configured to supply pressurized fluid to a valve body of the transmission. A controller is programmed to, in response to a loss of pressure of the primary pump and a speed of the output shaft exceeding a first threshold, shift the transmission to a neutral state, energize the secondary pump once the transmission is in the neutral state, and command the engine to idle speed.

20 Claims, 4 Drawing Sheets

(56) References Cited

U.S. PATENT DOCUMENTS

| | | | | |
|---|---|---|---|---|
| 2003/0196503 A1* | 10/2003 | Kobayashi | .............. | F16H 3/006 |
| | | | | 74/333 |
| 2018/0093669 A1* | 4/2018 | Khafagy | ......... | B60W 30/18054 |
| 2018/0172143 A1* | 6/2018 | Tsukizaki | ................ | F16H 61/12 |

* cited by examiner

SYSTEMS AND METHODS FOR OPERATING TRANSMISSION WITH AUXILIARY PUMP IN POWER-LIMITING MODE

TECHNICAL FIELD

This disclosure relates to automatic transmissions and more particularly to operating the transmission when a reduced transmission fluid pressure is detected.

BACKGROUND

Many vehicles are used over a wide range of vehicle speeds, including both forward and reverse movement. Some types of engines, however, are capable of operating efficiently only within a narrow range of speeds. Consequently, transmissions capable of efficiently transmitting power at a variety of speed ratios are frequently employed. When the vehicle is at low speed, the transmission is usually operated at a higher speed ratio such that it multiplies the engine torque for improved acceleration. At high vehicle speed, operating the transmission at a lower speed ratio permits an engine speed associated with quiet, fuel efficient cruising. Typically, a transmission has a housing mounted to the vehicle structure, an input shaft driven by an engine crankshaft, and an output shaft driving the vehicle wheels, often via a differential assembly which permits the left and right wheel to rotate at slightly different speeds as the vehicle turns.

Discrete ratio transmissions are capable of transmitting power via various power flow paths, each associated with a different speed ratio. A particular power flow path is established by engaging particular shift elements, such as clutches or brakes. Shifting from one gear ratio to another involves changing which shift elements are engaged. In many transmissions, the torque capacity of each shift element is controlled by routing fluid to the shift elements at controlled pressure. A controller adjusts the pressure by sending electrical signals to a valve body.

SUMMARY

According to one embodiment, a vehicle includes a transmission having an input shaft, an output shaft, a valve body, and a plurality of clutches in fluid communication with the valve body and engageable in sets to establish a plurality of power flow paths having different gear ratios between the input and output shafts. A mechanical pump is configured to supply pressurized fluid to the valve body, and an electric pump configured to supply pressurized fluid to the valve body. A controller is programmed to, in response to loss of pressure from the mechanical pump and a vehicle speed being less than a first threshold, energize the electric pump and shift the transmission to a predetermined one of the gear ratios based on the vehicle speed, set an engine speed limit based on a target deceleration of the vehicle, and, in response to vehicle speed being less than a final speed target, disengage all clutches and de-energize the auxiliary pump.

According to another embodiment, a vehicle includes an engine and a transmission having an input shaft operably coupled to the engine, an output shaft operably coupled to wheels of the vehicle, a primary pump, and a secondary pump. The primary and secondary pumps are each configured to supply pressurized fluid to a valve body of the transmission. A controller is programmed to, in response to a loss of pressure of the primary pump and a speed of the output shaft exceeding a first threshold, (i) shift the transmission to a neutral state, (ii) energize the secondary pump once the transmission is in the neutral state, and (iii) command the engine to idle speed.

According to yet another embodiment, a method of operating a vehicle in a power-limiting mode due to loss of transmission fluid pressure includes, in response to a loss of pressure of a primary transmission pump and a vehicle speed exceeding a first threshold, shifting a transmission to a neutral state and energizing a secondary transmission pump. The method further includes, in response to the vehicle speed being less than the first threshold and greater than a second threshold, shifting the transmission to a predetermined forward drive gear and limiting the vehicle speed to slow the vehicle.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
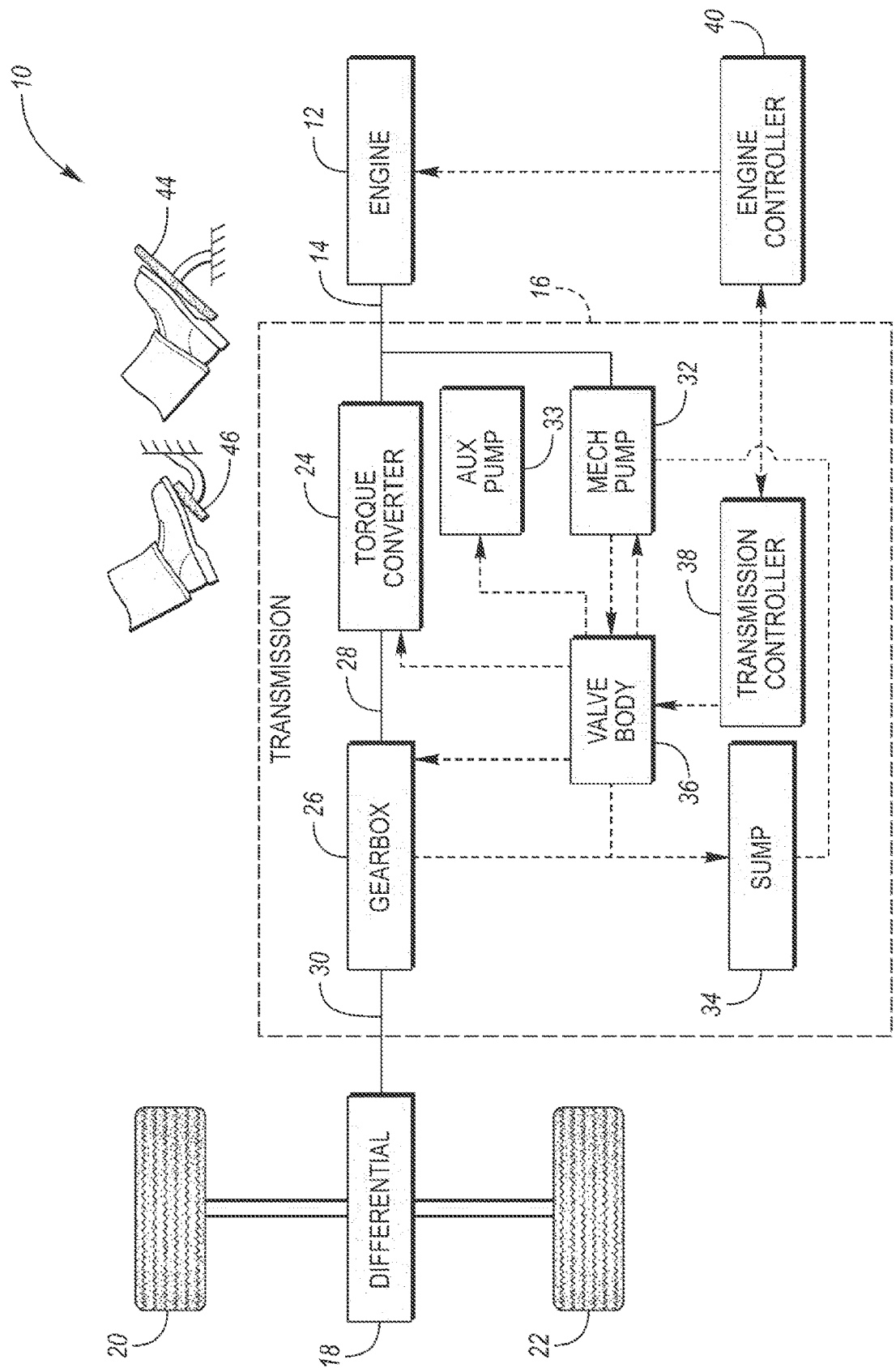
FIG. 1 is a schematic diagram of a vehicle powertrain.

FIG. 1 schematically illustrates a vehicle 10. Solid lines represent mechanical power flow connections; dashed lines represent the flow of hydraulic fluid or information signals. Power is provided by an actuator, such as internal combustion engine 12 or an electric motor. The transmission 16 adjusts the torque and speed to suit vehicle needs and delivers the power to a differential 18. The differential 18 transmits the power to left and right rear wheels 20 and 22, permitting slight speed differences as the vehicle turns a corner.

The transmission 16 includes a torque converter 24 and a gearbox 26. The torque converter 24 transmits torque hydrodynamically based on a speed difference between an impeller which is driven by crankshaft 14 and a turbine which drives a gearbox input shaft 28 (sometimes called a turbine shaft or a transmission input shaft). Power is transmitted from the impeller to the turbine via moving fluid whenever the impeller rotates faster than the turbine. The torque converter 24 may include a stator that redirects the fluid when the impeller is rotating substantially faster than the impeller such that the turbine torque is a multiple of the impeller torque. The gearbox 26 includes gearing and shift elements, e.g., clutches, configured to establish various power flow paths between the input shaft 28 and the output shaft 30. Each power flow path may be established by engaging an associated subset of the shift elements. At low vehicle speed, a power flow path providing torque multiplication and speed reduction between the turbine shaft and the output shaft may be established to optimize vehicle performance. At higher vehicle speeds, a power flow path providing speed multiplication may be established to minimize fuel consumption.

The clutches within the gearbox 26 are engaged by supplying hydraulic fluid at an elevated pressure to a clutch apply chamber. Each clutch may include a clutch pack having friction plates splined to one component and interleaved with separator plates splined to a different component. The fluid forces a piston to squeeze the clutch pack such that frictional force between the friction plates and the separator plates couples the components. The torque capacity of each clutch varies in proportion to changes in the fluid pressure. A pump 32, driven by the crankshaft 14 or electrically, draws fluid from the sump 34 and delivers it at an elevated pressure to a valve body 36. The valve body 36 delivers the fluid to the clutch apply chambers at a pressure controlled in accordance with signals from a transmission controller 38. In addition to the fluid provided to the apply chambers, the valve body 34 provides fluid for lubrication and for the torque converter 24. The fluid eventually drains from the gearbox 26 back to the sump 34 at ambient pressure. The term "clutch" is used generically herein to describe shift elements that couple two rotating components and to describe shift elements that couple a rotating component to a fixed component, e.g., a housing. (Some people refer to the latter as a "brake," but, for simplicity, it will be called a clutch in this disclosure.)

The transmission 16 includes one or more pumps to provide pressurized fluid to the valve body 36. For example, the vehicle 10 includes a pair of pumps 32 and 33. Pump 32 may be a primary pump that is more powerful than the secondary pump 33. For example, the primary pump 32 may have a higher hydraulic pressure rating than the auxiliary pump 33. The primary pump 32 may be a mechanical pump that is powered by the engine 12 and the auxiliary pump 33 may be an electric pump. The auxiliary pump 33 may be provided primarily to maintain hydraulic pressure when the vehicle is in a start-stop condition or in an electric-only mode. As will be described in detail below, the auxiliary pump 33 may also be used to operate the transmission during forward propulsion in limited circumstances and for a limited period of time. While the transmission pumps in the illustrated embodiments are a mechanical main pump and an electric auxiliary pump, this need not be the case and both pumps may be mechanical or electrical, or the main pump may be electrical and the auxiliary pump may be mechanical.

An engine controller 40 adjusts various actuators in the engine 12 to control the level of torque delivered at the crankshaft. For example, the controller 40 may adjust a throttle opening, fuel injection quantity and timing, spark timing, camshaft timing, or the like. The engine controller 40 may determine the desired level of wheel torque predominantly based on driver input via an accelerator pedal 44. The engine controller 40 is in communication with a transmission controller 38 and may adjust the torque output or speed based on requests from the transmission controller 38. The engine controller 40 and the transmission controller 38 may be separate microprocessors communicating via a controller area network or their various functions may be combined into a single microprocessor or split among more than two microprocessors.

The controllers 38 and 40 may be part of a larger control system and may be controlled by various other controllers throughout the vehicle, such as a vehicle system controller (VSC). It should therefore be understood that the controller 38, 40 and one or more other controllers can collectively be referred to as a "controller" that controls various actuators in response to signals from various sensors to control functions such as shifting the transmission, controlling engine torque, etc. Any recital of "a controller" refers to one or more controllers. The controller(s) may include a microprocessor or central processing unit (CPU) in communication with various types of computer-readable storage devices or media. Computer-readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the vehicle. The controller(s) communicates with various vehicle sensors and actuators via an input/output (I/O) interface that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU.

The vehicle 10 may include an accelerator pedal 44 and a brake pedal 46 that may be in communication with one or more controllers, e.g., controllers 38 and/or 40. The accelerator pedal 44 may include a sensor configured to output an accelerator-pedal position signal. The controller is configured to interpret the signal as a driver-demanded torque. The controllers are configured to operate the engine to produce the driver-demanded torque during normal operation. During some situations, such as during a transmission shift, the controller may operate the engine to produce less than the driver-demanded torque, and in some instances, produce a negative engine torque. The brake pedal 46 may also include a sensor configured to output a brake-pedal position signal. The controller is configured to receive the brake-pedal position signal and determine a driver-requested braking torque that is commanded to the braking system of the vehicle.

Figure 2:
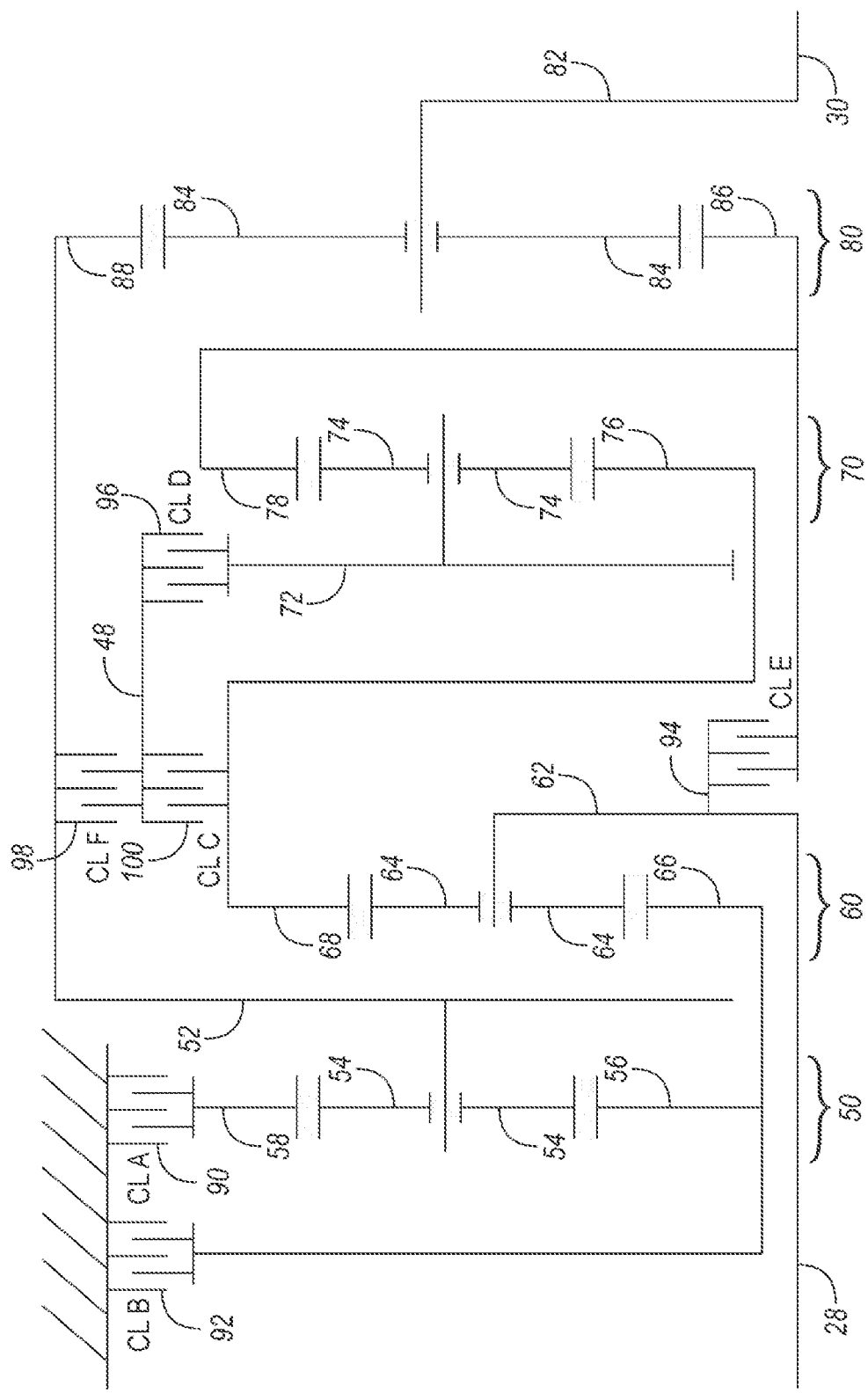
FIG. 2 is a schematic diagram of a transmission system.

The transmission 16 may be a step-ratio automatic transmission as schematically illustrated in the example of FIG. 2. The transmission utilizes four simple planetary gear sets 50, 60, 70, and 80. Sun gear 56 is fixedly coupled to sun gear 66, carrier 52 is fixedly couple to ring gear 88, ring gear 68 is fixedly coupled to sun gear 76, ring gear 78 is fixedly coupled to sun gear 86, turbine shaft 28 is fixedly coupled to carrier 62, and output shaft 30 is fixedly coupled to carrier 82. Ring gear 58 is selectively held against rotation by brake 90 and sun gears 56 and 66 are selectively held against rotation by brake 92. Turbine shaft 28 is selectively coupled to ring gear 78 and sun gear 86 by clutch 94. Intermediate shaft 48 is selectively coupled to carrier 72 by clutch 96, selectively coupled to carrier 52 and ring gear 88 by clutch 98, and selectively coupled to ring gear 68 and sun gear 76 by clutch 100. A suggested ratio of gear teeth for each planetary gear set is listed in Table 1.

TABLE 1

| | |
|---|---|
| Ring 58/Sun 56 | 2.20 |
| Ring 68/Sun 66 | 1.75 |
| Ring 78/Sun 76 | 1.60 |
| Ring 88/Sun 86 | 3.70 |

As shown in Table 2, engaging the clutches in combinations of four establishes ten forward speed ratios (also referred to as gears or gear ratios) and one reverse speed ratio between the turbine shaft 28 and the output shaft 30. An X indicates that the clutch is required to establish the speed ratio. An (X) indicates the clutch can be applied but is not required to establish the power flow path. In first gear, either clutch 98 or clutch 100 can be applied instead of applying clutch 96 without changing the speed ratio. When the gear sets have tooth numbers as indicated in Table 1, the speed ratios have the values indicated in Table 2. Of course, this is just one example.

TABLE 2

| | A<br>90 | B<br>92 | C<br>100 | D<br>96 | E<br>94 | F<br>98 | Ratio | Step |
|---|---|---|---|---|---|---|---|---|
| Rev | X | X | | X | | X | −4.79 | 102% |
| 1$^{st}$ | X | X | | (X) | X | | 4.70 | |
| 2$^{nd}$ | X | X | X | X | | | 2.99 | 1.57 |
| 3$^{rd}$ | X | | X | X | X | | 2.18 | 1.37 |
| 4$^{th}$ | X | | X | X | | X | 1.80 | 1.21 |
| 5$^{th}$ | X | | X | | X | X | 1.54 | 1.17 |
| 6$^{th}$ | X | | | X | X | X | 1.29 | 1.19 |
| 7$^{th}$ | | | X | X | X | X | 1.00 | 1.29 |
| 8$^{th}$ | | X | | X | X | X | 0.85 | 1.17 |
| 9$^{th}$ | | X | X | | X | X | 0.69 | 1.24 |
| 10$^{th}$ | | X | X | X | | X | 0.64 | 1.08 |

In operation, clutches 90, 92, 96, and 94 may be engaged while the vehicle is stopped in Drive such that the vehicle is launched in first gear. When the vehicle reaches a sufficient speed, the transmission is shifted into second gear by releasing clutch 94 and engaging clutch 100. For this shift, clutch 94 is called the off-going clutch (OFG) and clutch 100 is called the oncoming clutch (ONC). To effectuate the shift, the controller adjusts the pressures supplied to the apply chambers of these two clutches and modulates the engine torque.

The term "neutral" refers to the input shaft and the output shaft being decoupled from each other such that power cannot be transmitted through the transmission. In a step-ratio automatic transmission, such as the above-described transmission, multiple clutches must be engaged in order to couple the input and output shafts and achieve GEAR. Normally, when the driver places the gear shifter in the NEUTRAL range, all of the transmission clutches are disengaged. This may be referred to as a "zero-clutch neutral." However, this is not the only type of neutral. The transmission also includes several other neutral states having unique combinations of engaged clutches. In one embodiment, the transmission 16 has 36 different neutral states. Generally, the transmission requires four engaged clutches to achieve a gear ratio, as such, engaging three or less clutches typically places the transmission in neutral. Table 3 shows several possible neutral states. Table 3 is not an exhaustive list of all of the possible neutral states of the transmission 16.

TABLE 3

| Neutral State | 90 | 92 | 100 | 96 | 94 | 98 |
|---|---|---|---|---|---|---|
| 1 | | | X | | X | X |
| 2 | | X | X | | | |
| 3 | X | | X | | | |
| 4 | X | | | | | |
| 5 | | | | | | |

The number of engaged clutches for the different neutral states varies. For example, Neutral State 1 includes three engaged clutches (highest neutral state). This may be referred to as "three-clutch neutral." "Highest neutral state" refers to a neutral state that has one less engaged clutch than is required for GEAR. Since example transmission 16 requires four engaged clutches for gear, the highest neutral state is three-clutch neutral. Neutral State 2 includes two engaged clutches. This may be referred to as "two-clutch neutral." Neutral State 4 includes one engaged clutch. This may be referred to as "one-clutch neutral." Neutral State 5 has no clutches that are engaged (lowest neutral state) and is a zero-clutch neutral. Since three-clutch neutral is only one engaged clutch away from GEAR, the transmission is able to shift from NEUTRAL to GEAR or GEAR to NEUTRAL faster than from a two-clutch neutral for example. As such, it is advantageous for the transmission to be in three-clutch neutral when a fast shift time is desired.

Referring back to FIG. 1, capacity of a clutch is related to the hydraulic pressure applied its piston chamber based on a clutch transfer function that generally correlates clutch capacity to hydraulic pressure applied. As such, the transmission 16 has reduced clutch capacities when the main pump 32 is OFF and the electric pump 33 is ON. The transmission 16 primarily designed to utilize the main mechanical pump 32 to operate the transmission when the engine is ON and may utilize the auxiliary electric pump 33 during start-stop (or in the case of a hybrid, an electric-only mode) when the engine is OFF. Due to its limited duty cycle and design intent, the auxiliary electric pump 33 may be sized substantially smaller than the main pump 32. The main pump 32 is designed to provide sufficient pressures to prevent clutch slip during maximum torque production of the engine, whereas the auxiliary pump 33 is designed to provide sufficient pressures to prevent clutch slip when the input torque to the transmission is reduced or in some cases zero.

In the vehicle 10, the inclusion of the auxiliary pump 33 provides an opportunity for continued driving of the vehicle for a limited amount of time and at reduced functionality when the main pump has reduced output resulting in a loss or reduction of fluid pressure. This may be referred to as a power-limiting mode in which the vehicle can be driven at reduced power and for a limited duration subsequent to the detected pressure loss or reduction.

Control logic or functions performed by controller may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle, engine, and/or powertrain controller, such as controller. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

Figure 3A:
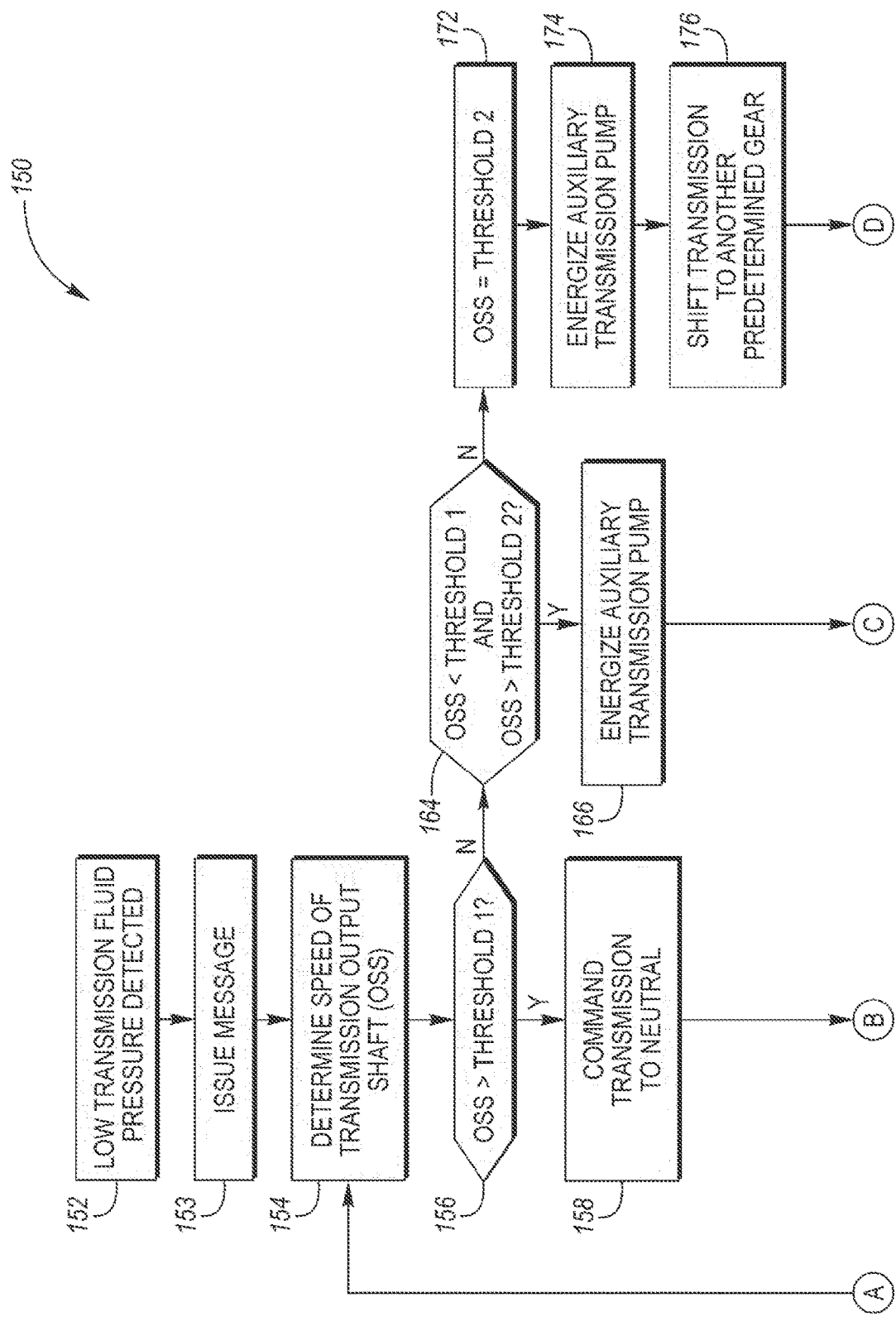
FIGS. 3A and 3B show a flowchart of an algorithm for operating the vehicle in the power-limiting mode.
Figure 3B:
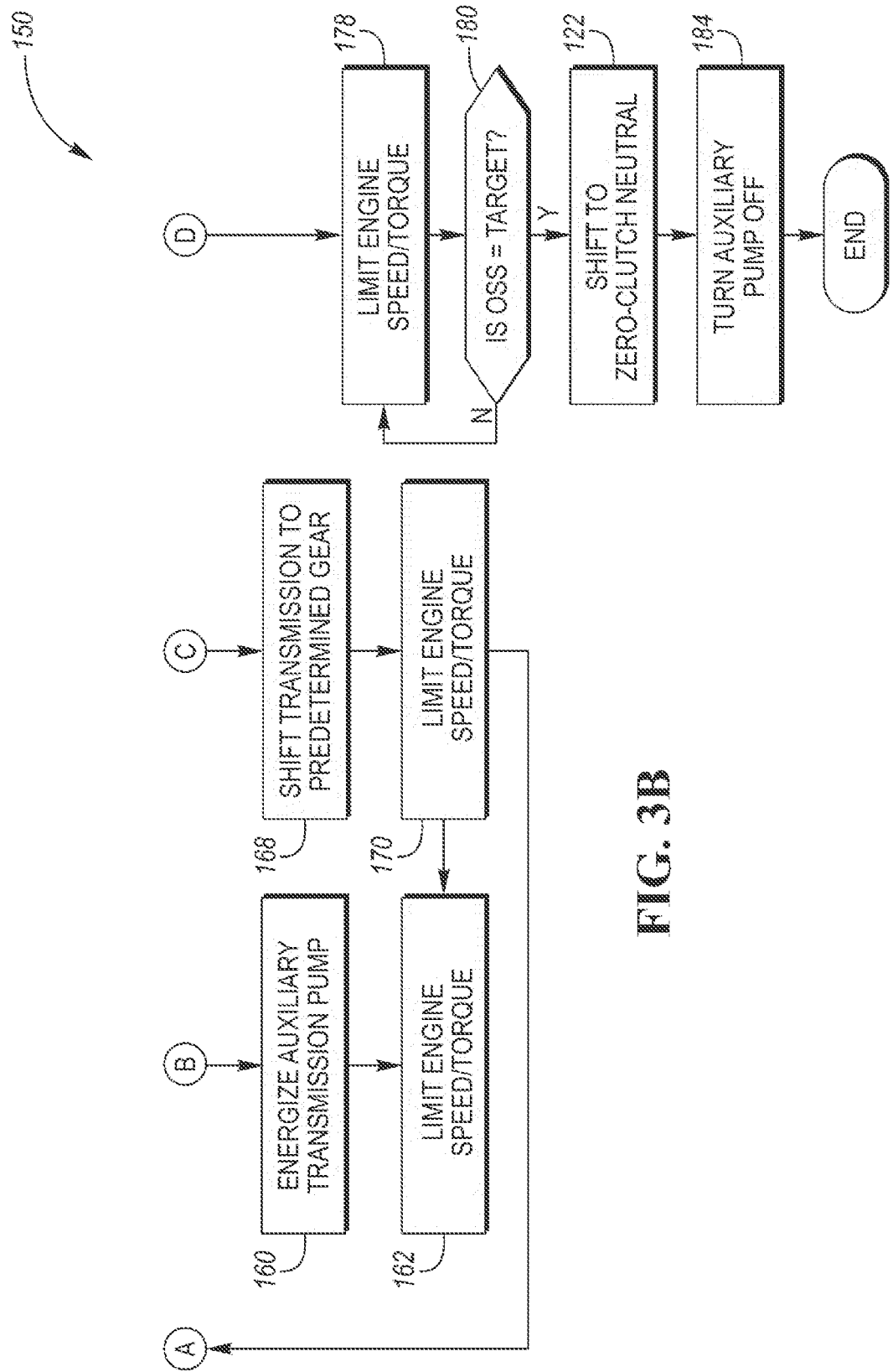

FIG. 3 is a flowchart 150 of an algorithm for controlling the vehicle in a power-limiting mode. Control begins at operation 152 when a low transmission fluid pressure is detected (a pressure loss). The pressure loss may be detected by monitoring clutch slip or by measuring the fluid pressure. If multiple clutches slip in short succession, this indicates low fluid pressure. At operation 153, a message is issued to the driver to indicate the low fluid pressure. The message may be a graphics/text displayed on a display, a light on the instrument panel, an auditory sound, haptic feedback, or the like. In the case of a display message, the message may include a narrative describing the problem. For example, the message may state that a low fluid pressure is detected and provide further instructions to the driver. The further instructions may explain how to operate the vehicle in the power-limiting mode.

The power-limiting mode is intended to provide an operating window for a driver to drive the vehicle to the side of the road or to place the vehicle in a better location for service. The power-limiting mode may only be provided for a predetermined time starting with the detected pressure loss. The duration of the power-limiting mode may be based on the design of the transmission and the power of the auxiliary pump. Some constraints on the predetermined time include the ability of the auxiliary pump to provide lubrication to the transmission and the pressure rating of the auxiliary pump. In some embodiments, the power-limiting mode has a maximum duration of three minutes, in others two minutes, and in yet others one minute. These are, of course, just nonlimiting examples.

In accordance with the predetermined time, a vehicle speed limit is imposed and monotonically reduces according to a target vehicle deceleration during the power-limiting mode to encourage the driver to ceases operation of the vehicle as quickly and safely as possible. Since the maximum time for the power-limiting mode is fixed, the target deceleration varies based on the speed of the vehicle at the time of pressure low. As such, the execution of the power-limiting mode differs based on the initial vehicle speed. The controls may achieve the target vehicle deceleration by limiting the engine speed and torque. The controls may track, measure, and target the transmission output-shaft speed (illustrated embodiment) or the vehicle speed when determining the engine speed/torque limits.

At operation 154, the controller determines the transmission output-shaft speed (OSS). For example, the transmission may include a sensor configured to measure the speed of the output shaft. The output-shaft speed sensor may be configured to output a signal indicative of a measured speed to the controller. The controller is programmed to interpret that signal and determine the measured speed. Alternatively, the speed of the output shaft may be inferred through other measured speeds and/or torques.

At operation 156, the controller determines if the output-shaft speed is greater than an upper threshold (Threshold 1). The upper threshold may be based on the torque capacity requirements of the transmission clutches when in the upper gear ratios and the pressure rating of the auxiliary pump. In some vehicles, the transmission may be operated by the auxiliary pump in the higher gear ratios, e.g., sixth gear, leading to a faster upper speed threshold, whereas in other vehicles, the auxiliary pump is unable to operate the transmission in the higher gear ratios leading to a slower upper speed threshold. In one or more embodiments, the transmission output-shaft speed threshold may be between 2700 to 3150 revolutions per minute (RPM) which correlates to a vehicle speed of 60 to 70 miles per hour depending upon the speed ratio between the driven wheels and the transmission output shaft.

If yes at operation 156, control passes to operation 158 and the controller commands the transmission to a predetermined neutral as the vehicle speed is too fast to be in GEAR. The neutral at operation 158 may be a neutral state that includes engaged clutches, e.g., a three-clutch neutral. Using a three-clutch neutral at operation 158 will allow for a quicker shift to GEAR later in the process, e.g., step 168. The neutral state at operation 158 may be one that shares clutches with the predetermined gear that will be shifted to once the vehicle speed drops below Threshold. For example, the three-clutch neutral at operation 158 may be one clutch away from the predetermined gear. In the illustrated embodiment, the neutral state of operation 158 may be Neutral State 1 from Table 3. Following the shift to neutral, the auxiliary transmission pump is energized at operation 160. In operation 162, the controller limits the engine speed and torque. At operation 162, the transmission is in neutral and the engine may be limited to a speed and torque associated with idle. The controller may place a maximum engine speed limit, such as 3,000 rpm, which may be near the engine speed that will be achieved when the transmission transitions to gear once the vehicle slows down. {Inventors, please provide a description of how an engine is controlled when the transmission is in neutral and the car is coasting.} During this phase of the controls, the vehicle is in neutral and is coasting or braked by the driver to reduce the vehicle speed.

The control also loops until the output-shaft speed is less than the upper Threshold (threshold 1) and is greater than the lower threshold (Threshold 2) as determined at operation 164. If yes, control passes to operation 166 and the controller commands an energization of the auxiliary transmission pump. In some instances, the auxiliary pump may already be energized, and no action is taken. At operation 168, the controller commands the transmission to shift to a predetermined forward gear. The predetermined gear and the lower threshold correspond with each other. That is, the second threshold is a speed within the operational range of the predetermined gear. For example, the second threshold may be set to a speed that corresponds to an engine speed between 3000 and 6000 RPM.

As alluded to above, the neutral commanded at operation 158 and the predetermined gear of operation 168 may share clutches. For example, the predetermined gear may be fifth gear, which is clutches 90, 100, 94, and 98 and the neutral is Neutral State 1, which is clutches 100, 94, and 98. This allows for a quick shift by only engaging a single clutch, clutch 90. Other three-clutch neutrals are also available for operation 158, such as, 90, 100, 94.

The predetermined gear may also be chosen based on maximum achievable clutch capacities with the auxiliary pump. Due to the plumbing of the valve body, the hydraulic circuits, and geometries of the clutches, some gears may require less hydraulic pressures than others to achieve a same torque capacity. In this example, fifth gear requires less hydraulic pressure than sixth gear and fourth gear to achieve acceptable clutch capacity. Or stated another way, the auxiliary pump is capable of producing more clutch capacity in fifth gear than in fourth or sixth gear. As such, in fifth gear, the transmission can accept more engine torque and output more wheel torque providing better drivability than the neighboring gears. Of course, fifth gear is merely one example and the gear chosen at operation 168 and the neutral chosen at operation 158 is dependent on the particular designs of the transmission and auxiliary pump.

At operation 170, the controller limits the engine torque and engine speed. The engine torque is limited to a value that will not exceed the maximum achievable clutch capacities with the auxiliary pump to prevent cutch slip. The controller also limits the engine speed and gradually reduces the engine speed limit monotonically to reduce the vehicle speed towards zero or a crawl speed depending upon the embodiment. The engine speed limit is reduced according to a rate that may be derived from a target deceleration of the transmission output shaft. The target deceleration monotonically decreases to reduce the engine speed limit at each loop of the controller, such as every 20 milliseconds. The gradually smaller engine speed limit is used to decelerate the vehicle toward zero as the power-limiting mode is only for a limited duration of time. The target deceleration may be predetermined or dynamic. In the dynamic example, the target deceleration may be based on the output-shaft speed when the pressure loss is flagged, a target end speed of the output shaft (e.g., 200 rpm), and the predetermined duration of time for the power-limiting mode (e.g., 1 minute). The deceleration may be in units of RPM per control loop.

An example calculation of the engine speed limit will now be described with the initial OSS being 2,200 rpm, the target OSS being 200 rpm, and the duration being 1 minute. The controller may first calculate a target deceleration using Equation 1 shown below. In this example, the target deceleration is 0.67 RPM/loop ([2200−200]÷[60000/20]).

$$\text{Target deceleration} = \frac{(\text{Initial } OSS - \text{Target } OSS)}{\text{\# of loops}} \quad \text{(Eq. 1)}$$

The target deceleration is the reduction of OSS/loop and needs to be converted to the engine domain to determine the engine speed limit. This can be done in several ways. For example, the controller may calculate an OSS limit based on the target deceleration (A) using Equation 2, which in this example is 2199.33 RPM at loop 1.

$$\text{OSS limit} = \text{Last OSS} - A \quad \text{(Eq. 2)}$$

Then, the controller may convert the OSS limit to the engine speed limit based on the gear ratio of the transmission and accounting for torque converter and other factors with a constant (K) as shown in example Equation 3. In this example, equation 3 yields an engine speed limit of 3686.97 RPM assuming a gear ratio of 1.54 and K is 300.

$$\text{Engine Speed Limit} = (\text{OSS Limit} \times \text{gear ratio}) + K \quad \text{(Eq. 3)}$$

The engine torque limit and the speed limit are clips on the driver-demanded torque. If the driver-demanded torque would exceed these limits, the controller reduces the torque and speed commands to the engine. The torque limit is sent to ensure clutches do not slip, and the engine speed limit is sent to slowly reduce vehicle speed within the target deceleration. The driver is free to slow the vehicle faster than the limits by requesting less driver-demanded torque or applying the friction brakes. The controller loops at operation 170 incrementally limiting engine speed and torque until the output-shaft speed reduces below the lower threshold (Threshold 2) at operation 172.

Threshold 2 is based on the last gear to be engaged during the controls 150. (The controls 150 only utilize a high gear and a low gear, but in other embodiments, three or more gears may be used during the power-limiting mode.) The transmission output-shaft speed threshold may be between 900 to 1800 revolutions per minute (RPM) which correlates to a vehicle speed of 20 to 40 miles per hour depending upon the speed ratio between the driven wheels and the transmission output shaft. In the illustrated embodiment, Threshold 2 is 30 MPH.

Operation 174 energizes the auxiliary pump if the controls initiate when the vehicle is less than Threshold 2. If the auxiliary pump is already ON, operation 174 is a pass through. At operation 176, the controller commands the transmission to downshift to another predetermined, e.g. second gear. Second gear may be chosen based on the same parameters used for choosing the first predetermined gear of operation 168. The another predetermined gear may also be chosen based on its ability to propel the vehicle at creep speeds (most vehicles can creep in second gear; third gear may be an option in some vehicles).

At operation 178, the controller again limits the engine speed and torque based on the constraints of the another gear, e.g. second gear. For example, the engine torque limit may be the same as, greater than, or less than the previous engine torque limit based on the achievable clutch capacities in second gear, which may be different than fifth gear because a different combination of clutches are engaged. The engine speed limit may be calculated as described above using Equations 1, 2, and 3. The speed limiting of operation 178 may be a continuation of the speed limiting that was occurring at operation 170. Alternatively, the speed limiting may begin anew at operation 178 with the initial output-shaft speed being the measured speed when Threshold 2 is met.

The controller loops incrementally limiting engine speed and torque at operation 178 until the output-shaft speed reduces to the target OSS, e.g., 200 RPM. Once the target output-shaft speed is reached, the engine by become limited to creep speeds. The controller shifts the transmission to the zero-clutch neutral when the vehicle comes to a stop. Following the shift, the auxiliary transmission pump is turned OFF at operation 184 and the power-limiting mode ends with the engine being turned OFF.

While the controls 150 use the OSS as the target and threshold speeds for setting the engine speed limit, the controls may also be programmed to use the vehicle speed (vs) in place of the OSS. The vehicle speed and the OSS are proportional when there is no wheel slip. Equation 4 may be used to convert between the output shaft domain and the wheel domain. In equation 4, D is the tire diameter in feet and FDR is the final drive ratio.

$$V_s = 1 + \frac{OSS}{FDR} \times \pi D \times 0.0114 \quad \text{(Eq. 4)}$$

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle comprising:
   a transmission including an input shaft, an output shaft, a valve body, and a plurality of clutches in fluid communication with the valve body and engageable in sets to establish a plurality of power flow paths having different gear ratios between the input and output shafts;
   a mechanical pump configured to supply pressurized fluid to the valve body;
   an electric pump configured to supply pressurized fluid to the valve body; and
   a controller programmed to:
      in response to loss of pressure from the mechanical pump and a vehicle speed being less than a first threshold, energize the electric pump and shift the transmission to a predetermined one of the gear ratios based on the vehicle speed,
      set an engine speed limit based on a target deceleration of the vehicle, and
      in response to vehicle speed being less than a final speed target, disengage all clutches and de-energize the electric pump.

2. The vehicle of claim 1, wherein the target deceleration rate is based on a difference between the vehicle speed when the pressure loss occurs and the final speed target.

3. The vehicle of claim 2, wherein the target deceleration rate is further based on a quotient of the difference and a predetermined time for operating the transmission with the electric pump.

4. The vehicle of claim 1, wherein the electric pump has a lower hydraulic pressure rating than the mechanical pump.

5. The vehicle of claim 1, wherein the set an engine speed limit further includes commanding a series of incrementally smaller engine speed limits based on the target deceleration of the vehicle.

6. The vehicle of claim 1, wherein the controller is further programmed to, in response to the vehicle speed being less than a second threshold, that is less than the first threshold, shift the transmission to a second predetermined one of the gear ratios.

7. The vehicle of claim 1, wherein the controller is programmed to, in response to the loss of pressure, issue a transmission message.

8. The vehicle of claim 1, wherein the controller is further programmed to, in response to the loss of pressure and the vehicle speed exceeding the first threshold, shift the transmission to a neutral state.

9. The vehicle of claim 8, wherein the neutral state includes at least one of the clutches being engaged.

10. The vehicle of claim 8, wherein the controller is further programmed to, in response to the transmission being in the neutral state, energize the electric pump.

11. A vehicle comprising:
    an engine;
    a transmission including an input shaft operably coupled to the engine, an output shaft operably coupled to wheels of the vehicle, a primary pump, and a secondary pump, wherein the primary and secondary pumps are each configured to supply pressurized fluid to a valve body of the transmission; and
    a controller programmed to, in response to a loss of pressure of the primary pump and a speed of the output shaft exceeding a first threshold, (i) shift the transmission to a neutral state, (ii) energize the secondary pump once the transmission is in the neutral state, and (iii) command the engine to idle speed.

12. The vehicle of claim 11, wherein the controller is further programmed to, in response to the speed of the output shaft being less than the first threshold and greater than a second threshold, shift the transmission from the neutral state to a forward gear.

13. The vehicle of claim 12, wherein the controller is further programmed to, in response to the speed of the output shaft being less than the second threshold, shift the transmission to another forward gear that is lower than the forward gear.

14. The vehicle of claim 12, wherein the controller is further programmed to, set a torque limit of the engine based on a hydraulic pressure rating of the secondary pump.

15. The vehicle of claim 12, wherein the controller is further programmed to, in response to the transmission being in the forward gear, command a series of monotonically decreasing speed limits to the engine based on a target final speed of the output shaft and a predetermined time window.

16. The vehicle of claim 11, wherein the primary pump is a mechanical pump powered by the engine and the secondary pump is an electric pump.

17. The vehicle of claim 11, wherein the transmission includes a plurality of clutches, and at least one of the clutches is engaged when the transmission is in the neutral state.

18. A method of operating a vehicle in a power-limiting mode due to loss of transmission fluid pressure, the method comprising:
    in response to a loss of pressure of a primary transmission pump and a vehicle speed exceeding a first threshold, shifting a transmission to a neutral state and energizing a secondary transmission pump; and
    in response to the vehicle speed being less than the first threshold and greater than a second threshold, shifting the transmission to a predetermined forward drive gear and limiting the vehicle speed to slow the vehicle.

19. The method of claim 18 further comprising, in response to the vehicle speed being less than the second threshold, shifting the transmission to another predetermined forward drive gear.

20. The method of claim 18, wherein the limiting the vehicle speed further includes commanding a series of monotonically decreasing engine speed limits.

* * * * *